Sept. 11, 1956 R. A. GAITHER 2,762,908
VEHICLE LAMP
Filed Jan. 14, 1953

Inventor
Raymond A. Gaither
By Willits, Helmig & Baillio
Attorneys 2,762,908
Patented Sept. 11, 1956

2,762,908
VEHICLE LAMP

Raymond A. Gaither, Pendleton, Ind., assignor to General Motors Corporation, Detroit, Mich., a corporation of Delaware Application January 14, 1953, Serial No. 331,231

5 Claims. (Cl. 240—41)

The subject of this invention is a lamp mounting and more particularly, a lamp mounting which provides a resilient and shock absorbing base for the lighting unit in the lamp without at the same time causing undesirable whip that results in a jiggling of the light beam.

On numerous types of Army vehicles, trucks, farm vehicles, etc., which are designed to operate cross-country or over rough roads, it is necessary to mount the headlamps so as to provide a certain amount of resiliency and shock resistance since without such means there is frequent lamp failure due chiefly to injury of the lighting filaments. The conventional method of providing such a mounting is to place a suitable rubber cushion in the lamp support, the lamp per se being of ordinary construction. Thus, the lamp support may be an elongated metal member having one end secured to the vehicle and the other end secured to the lamp through a cushion such as a rubber grommet or the like. While such an arrangement may provide the shock proofing qualities desired, at the same time it causes undesirable lamp whip. This whip results in a jiggling of the light beam which is highly irritating both to the driver of the vehicle on which the lamp is mounted and to the drivers of oncoming vehicles. One of the chief causes of this whip is that the entire weight of the lighting unit and its housing is borne by the resilient cushion. Since little damage can occur to the lamp housing due to shock and vibration, it would be preferable to locate the shock proofing cushion so that it bears only the weight of the part to be protected from shock, namely, the lighting unit itself. To accomplish such a mounting device is one of the objects of this invention.

In accordance with the invention, the resilient cushion takes the form of an annular gasket which is positioned between the lighting unit and the housing.

I have found that not all types or shapes of resilient gaskets give equally good results. The provision of a gasket which is particularly adapted to provide an excellent shock-proof mounting but which, at the same time, prevents lamp whip is another of the objects of this invention. This object is carried out by using in the lamp mounting a gasket which is provided with a plurality of circumferential ribs, these ribs being the sole means of contact between the housing with the lighting unit.

Other objects and advantages of my invention will appear more clearly from the following detailed description and from the drawing in which.

Figure 1:
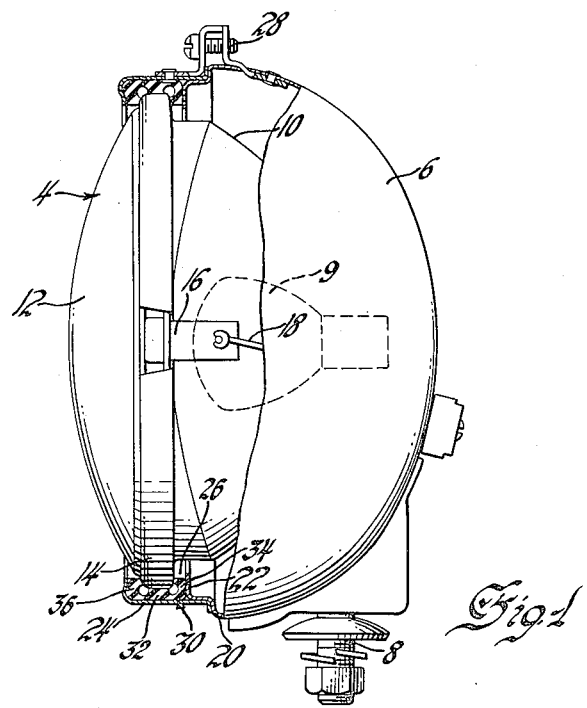
Figure 1 is a side view with parts broken away of a vehicle headlamp embodying the invention.
Figure 2:
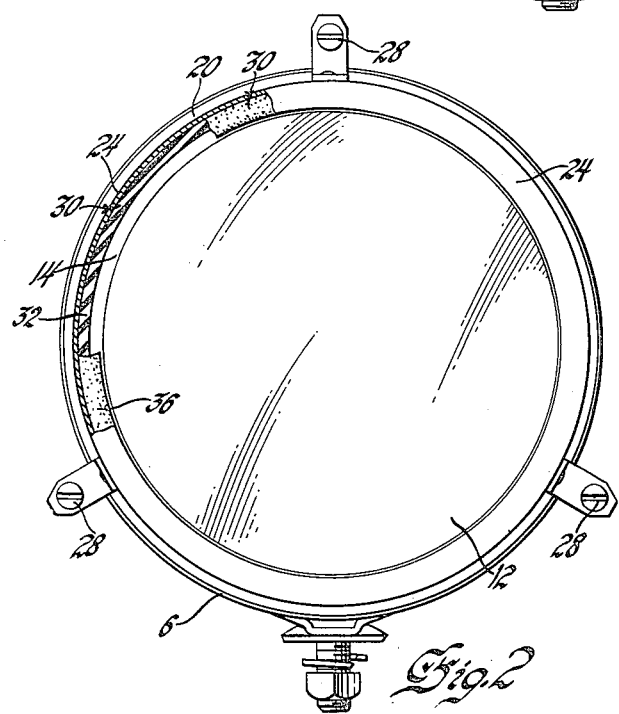
Figure 2 is a front view with parts broken away of the lamp shown in Figure 1.

Referring now to the drawing and in particular to Figures 1 and 2, there is shown a lighting unit 4 of the sealed-beam type mounted in a housing 6 having a support 8 for attachment to the vehicle. The lighting unit 4 comprises a lighting element 9 and a concave paraboloidal metal reflector 10, in the open end of which is a lens 12 which is secured to the reflector by turning the circumferential edge of the reflector 10 first outwardly, then forwardly and finally inwardly over the edge of the lens. This turned edge portion of the reflector forms a radially outwardly extending circumferential flange 14 which is used to mount the lighting unit as hereinafter described in detail.

In the particular lamp shown, the sealed unit 4 utilizes as a light source, a light bulb 9 which is secured on the metal reflector by soldering or other suitable means. It is to be understood, however, that other types of sealed beam units such, for example, as that which is of an all glass construction may also be used in accordance with the invention. Also, lighting units of the unsealed type having separate reflector and lens members held in assembled relationship by a suitable means may similarly be used, it only being necessary that the unit have a circumferential flange such as that shown at 14 in Figure 1.

In the embodiment shown, an edge portion of the reflector 10 is bent backwardly to form a contact 16 for connection of the grounding cable 18, the grounding circuit in this instance passing through the metal reflector from the base of the light bulb 9. The other end of the cable 18 is, of course, secured to the lamp housing in any suitable manner.

The lamp housing 6 includes a cup-shaped casing 20 having an inwardly turned edge 22, and a bezel 24 which cooperates with the edge 22 to form a radially inwardly facing annular channel 26. Circumferentially spaced fasteners 28 maintain the casing 20 and bezel 24 in assembled relationship.

Figure 3:
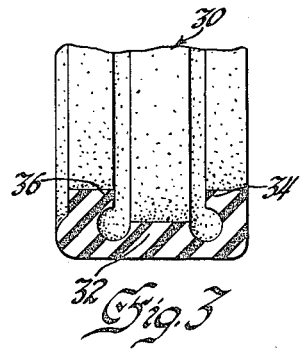
Figure 3 is an enlarged sectional view of the gasket shown in Figures 1 and 2.

Positioned in the channel 26 is a resilient gasket 30 preferably made of natural or synthetic rubber. As can best be seen in Figure 3, the gasket 30 has an approximately U-shaped cross-section and is formed with three annular ribs 32, 34 and 36 generally circumscribing the flange 14, one of these ribs, 32, extending radially inwardly from the base of the gasket and the other two, 34 and 36, extending axially inwardly toward each other from opposite sides of the gasket. With the lighting unit 4 in position as shown, the flange 14 fits snugly between the ribs 34 and 36 and against the base rib 32. Thus, aside from the electrical contacts, the only connection between the lighting unit 4 and the housing 6 is through the three annular ribs 32, 34 and 36.

To best assure a shock proof resilient mounting but at the same time prevent undesirable whip, I prefer to form the gasket 30 of a material having from 25 to 65 durometer resiliency and to form the ribs of such a width and thickness as to allow from about 5% to 50% compression when the lighting unit is positioned in the gasket. The exact width and thickness of the ribs necessary to attain a compression of from about 5% to 50% will, of course, not only depend on the exact resiliency of the gasket material but also on the dimensions of the lighting unit flange 14. If the compression of the ribs is less than about 5%, I have found that a loose fit with the lighting unit and undesirable whip may result. One of the reasons for this may be the non-uniformity in the size of the flange 14 due to the inaccuracies in manufacture of the lighting unit. Between spaced points on the flange 14 there may be as much as .08 inches difference in thickness and .1 inches difference in diameter. If the compression of the ribs is greater than about 50%, the shock resistance of the mounting is lessened, the reason for this being, of course, that highly compressed rubber has less resiliency than when it is only slightly compressed.

The gasket 30 may either be of a continuous or split construction. A continuous gasket can be manufactured by molding whereas the split type can be made by an extrusion process. If the latter process is used, the gasket should preferably be extruded in a helical shape in order to prevent undesirable deformation of the ribs when the gasket is positioned in the channel 26.

In addition to its function of providing an excellent shock resistant mounting, the gasket 30 in cooperation with the flange 14 serves also as a seal to prevent the entrance of dust, water, etc., into the lamp housing.

To assemble the lamp, the gasket 30 is first placed in the bezel 24. Then the lighting unit 4 is positioned in the bezel with the flange 14 engaging the gasket as shown, after which the bezel 24 is secured to the casing 20 by means of the fasteners 28 to complete the assembly.

It is to be understood that, although the invention has been described with specific reference to particular embodiments thereof, it is not to be so limited since changes and alterations therein may be made which are within the full intended scope of this invention as defined by the appended claims.

I claim:

1. In a vehicle lamp of the type having a housing with an open end and a lighting unit including a concave reflector and a lens with edge portions secured together to form an outwardly extending circumferential flange positioned in the open end of said housing, a shock absorbing mounting for said lighting unit comprising an annular inwardly facing channel formed at the open end of said housing, and a resilient gasket positioned in said channel, said gasket having a generally U-shaped cross-section and having a plurality of flexible annular ribs, at least one of said ribs being formed on the base of said gasket and extending inwardly therefrom and at least one additional rib being formed on each of the opposite sides of said gasket and extending inwardly toward each other therefrom, said ribs being in contact with said lighting unit flange and those portions of said gasket between said ribs being out of contact with said flange to thereby provide a resilient cushion for said unit.

2. A vehicle lamp comprising a housing having an open end, a lighting unit having an outwardly extending circumferential flange, said lighting unit including a concave reflector, a light source mounted in said reflector and a lens positioned over the open end of said reflector, and a shock absorbing mounting securing said lighting unit in the open end of said housing including an annular inwardly facing channel formed at the open end of said housing and a resilient gasket positioned in said channel, said gasket having a generally U-shaped cross-section and having a plurality of flexible annular ribs, at least one of said ribs being formed on the base of said gasket and extending inwardly therefrom and at least one additional rib being formed on each of the opposite sides of said gasket and extending inwardly toward each other therefrom, said ribs being in contact with the lighting unit flange and being under a compression of from about 5% to 50% and those portions of said gasket between said ribs being out of contact with said flange to thereby provide a resilient cushion for said unit.

3. A vehicle lamp comprising in combination, a housing having an open end, a lighting unit positioned in the open end of said housing, said lighting unit including a concave reflector and a lens with edge portions secured together to form an outwardly extending circumferential flange, an inwardly facing annular channel formed at the open end of said housing, a rubber gasket positioned in said channel, said gasket having a generally U-shaped cross-section and having three flexible annular ribs, one of said ribs being formed on the base of said gasket and extending inwardly therefrom and the other two of said ribs being formed on opposite sides of said gasket and extending inwardly toward each other therefrom, said ribs being in contact with the lighting unit flange and those portions of said gasket between said ribs being out of contact with said flange to thereby provide a resilient cushion for said unit.

4. A vehicle lamp comprising in combination, a housing having an open end, a lighting unit positioned in the open end of said housing, said lighting unit including a concave reflector and a lens with edge portions secured together to form an outwardly extending circumferential flange, an inwardly facing annular channel formed at the open end of said housing, a rubber gasket having from 25 to 65 durometer resiliency positioned in said channel, said gasket having a generally U-shaped cross-section and having three flexible annular ribs, one of said ribs being formed on the base of said gasket and extending inwardly therefrom and the other two of said ribs being formed on opposite sides of said gasket and extending inwardly toward each other therefrom, said ribs being in contact with the lighting unit flange and being under a compression of from about 5% to 50% and those portions of said gasket between said ribs being out of contact with said flange to thereby provide a resilient cushion for said unit.

5. A vehicle lamp comprising in combination, a generally cup-shaped casing having an inwardly turned edge portion, a bezel secured to the open end of said casing and cooperating with said edge portion to form an annular inwardly facing channel, a lighting unit positioned in said casing, said lighting unit comprising a concave reflector having a light source positioned therein, a lens in the open end of said reflector and means for securing said reflector to said lens, said means forming an outwardly extending annular flange on said lighting unit, a rubber gasket having from 25 to 65 durometer resiliency positioned in said channel, said gasket having a generally U-shaped cross-section and having three flexible annular ribs, one of said ribs being formed on the base of said gasket and extending inwardly therefrom and the other two of said ribs being formed on opposite sides of said gasket and extending inwardly toward each other therefrom, said ribs being in contact with the lighting unit flange and being under a compression of from about 5% to 50% and those portions of said gasket between said ribs being out of contact with said flange to thereby provide a resilient cushion for said unit.

References Cited in the file of this patent

UNITED STATES PATENTS

| 1,334,924 | Renwick | Mar. 23, 1920 |
| 1,723,308 | Sipe | Aug. 6, 1929 |
| 2,114,350 | Lee | Apr. 19, 1938 |
| 2,267,707 | Bosten | Dec. 30, 1941 |
| 2,445,072 | Lee | July 13, 1948 |

FOREIGN PATENTS

| 505,768 | Great Britain | May 16, 1939 |